United States Patent
Fowler et al.

(10) Patent No.: US 10,427,738 B2
(45) Date of Patent: Oct. 1, 2019

(54) LIFTABLE AXLE SUSPENSION

(71) Applicant: Volvo Truck Corporation, Gothenburg (SE)

(72) Inventors: Arthur Nalson Fowler, Winston-Salem, NC (US); Robert Renie Brewer, High Point, NC (US)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 15/736,437

(22) PCT Filed: Jun. 18, 2015

(86) PCT No.: PCT/US2015/036370
§ 371 (c)(1),
(2) Date: Dec. 14, 2017

(87) PCT Pub. No.: WO2016/204762
PCT Pub. Date: Dec. 22, 2016

(65) Prior Publication Data
US 2018/0194412 A1  Jul. 12, 2018

(51) Int. Cl.
*B62D 61/12* (2006.01)
*B60G 9/02* (2006.01)
*B60G 11/27* (2006.01)

(52) U.S. Cl.
CPC .............. *B62D 61/12* (2013.01); *B60G 9/02* (2013.01); *B60G 9/025* (2013.01); *B60G 11/27* (2013.01);
(Continued)

(58) Field of Classification Search
CPC .......... B62D 61/12; B60G 11/27; B60G 9/02; B60G 9/025; B60G 2204/148;
(Continued)

(56) References Cited

U.S. PATENT DOCUMENTS

| | | | |
|---|---|---|---|
| 5,505,481 A | 4/1996 | Vandenberg et al. | |
| 6,062,578 A * | 5/2000 | Richardson | B60G 11/28 280/81.6 |
| 6,073,946 A * | 6/2000 | Richardson | B60G 11/28 280/124.128 |
| 6,135,470 A | 10/2000 | Dudding | |

(Continued)

FOREIGN PATENT DOCUMENTS

WO   WO 2014/074031 A1   5/2014

OTHER PUBLICATIONS

International Search Report and Written Opinion of the International Searching Authority for PCT International Application No. PCT/US2015/036370 dated Sep. 4, 2015, 7pp.

*Primary Examiner* — Darlene P Condra
(74) *Attorney, Agent, or Firm* — Sage Patent Group

(57) ABSTRACT

A suspension for a vehicle includes a pair of opposing upper and lower control arms that longitudinally locate an axle along the frame. The upper and lower control arms include first ends pivotably mounted to the ends of the axle at upper pivotable axle joints and a second lower pivotable axle joints, respectively. The upper and lower control arms include second ends that are pivotably mounted to frame hanger brackets at upper and lower pivotable hanger joints, respectively. The frame hanger bracket are laterally interposed between an upper and lower hanger joint so that an upper pivotable hanger joint is on one side of each frame hanger and a lower pivotable hanger joint is on an opposite side of the each frame hanger.

20 Claims, 5 Drawing Sheets

(52) U.S. Cl.
CPC .. *B60G 2200/314* (2013.01); *B60G 2200/346* (2013.01); *B60G 2200/347* (2013.01); *B60G 2200/445* (2013.01); *B60G 2202/152* (2013.01); *B60G 2202/412* (2013.01); *B60G 2204/143* (2013.01); *B60G 2204/148* (2013.01); *B60G 2204/1482* (2013.01); *B60G 2204/4302* (2013.01); *B60G 2204/4702* (2013.01); *B60G 2206/011* (2013.01); *B60G 2206/601* (2013.01); *B60G 2300/0262* (2013.01)

(58) Field of Classification Search
CPC ...... B60G 2204/143; B60G 2300/0262; B60G 2206/601; B60G 2206/011; B60G 2204/4302; B60G 2200/314; B60G 2202/412; B60G 2202/152; B60G 2200/445; B60G 2200/347; B60G 2200/346; B60G 2204/1482; B60G 2204/4702
See application file for complete search history.

(56) References Cited

U.S. PATENT DOCUMENTS

| | | | |
|---|---|---|---|
| 6,398,236 B1* | 6/2002 | Richardson | B60G 11/30 280/124.157 |
| 6,752,409 B1* | 6/2004 | Kunert | B60G 3/20 280/124.135 |
| 6,808,035 B1* | 10/2004 | Keeler | B60G 7/02 180/197 |
| 2004/0084866 A1 | 5/2004 | Ramsey | |
| 2004/0164511 A1 | 8/2004 | Gottschalk | |
| 2006/0237941 A1* | 10/2006 | Smith | B60G 3/20 280/124.135 |

* cited by examiner

LIFTABLE AXLE SUSPENSION

FIELD OF THE INVENTION

The present invention relates to a suspension system for a self-steering liftable axle that may be deployed when the vehicle is carrying a heavy load and lifted when the vehicle is unloaded.

BACKGROUND OF THE INVENTION

Liftable axles, such as tag or pusher axles, may be provided on vehicles, including truck tractors, such as, for example, dump trucks or cement mixers. When the vehicle is deployed, such liftable axles assist in transferring the vehicle load to the ground. When the vehicle is unloaded, such liftable axles may be lifted off the ground, to prevent undue tire wear and improve fuel economy.

Tag or pusher liftable axles present a number of problems, due to the fact they typically are self-steering and liftable, including limiting the vehicle speed and articulations of the vehicle or the tag or pusher axle, when the axle is lowered. Such axles also typically present increased wheel wobble and tire wear, reduced roll rate, reduced lateral stiffness, unequal load distribution, and reduced agility, especially on rough terrain. Furthermore, such axles experience additional bending loads due to lateral and breaking loads, which necessitate the use of very robust and heavy liftable axles, which further reduce fuel economy and occupy valuable vehicle space.

The present invention is directed towards an improved suspension system for a self-steering liftable axle.

SUMMARY OF THE INVENTION

According to one embodiment, a suspension system for a vehicle comprises a frame, an axle, opposing first and second frame hanger brackets, an axle assembly lift system, steering stabilizers, first upper and lower control arms, and second upper and lower control arms. The frame includes opposing longitudinal vehicle frame members. The axle includes wheels, provided with a lifted position and a lowered position. The opposing first and second frame hanger brackets are mounted to the opposing longitudinal vehicle frame members. The axle lift system adapted to lift or lower the axle. The steering stabilizers are adapted to bias the wheels in a substantially longitudinally forward direction. The first upper and lower control arms longitudinally locate a first end of the axle along the frame, include first ends pivotably mounted to the first end of the axle via a first upper pivotable axle joint and a first lower pivotable axle joint, respectively, wherein the first upper and lower pivotable axle joints are substantially aligned with each other in a lateral direction and vertically spaced from each other in a vertical direction, include second ends that are pivotably mounted to the first frame hanger bracket via first upper and lower pivotable hanger joints, respectively, wherein the first upper and lower pivotable hanger joints are spaced with respect to each other in the lateral direction and vertically spaced from each other in the vertical direction, and diverge, in opposite directions, laterally inward and outward, respectively, from the first upper and lower pivotable axle joints to the first upper and lower pivotable hanger joints. The second upper and lower control arms longitudinally locate a second end of the axle along the frame, include first ends pivotably mounted to the second end of the axle at second upper pivotable axle joint and a second lower pivotable axle joint, respectively, wherein the second upper and lower pivotable axle joints are substantially aligned with each other in a lateral direction and vertically spaced from each other in a vertical direction, include second ends that are pivotably mounted to the second frame hanger bracket via second upper and lower pivotable hanger joints, respectively, wherein the second upper and lower pivotable hanger joints are spaced with respect to each other in the lateral direction and vertically spaced from each other in the vertical direction, and diverge, in opposite directions, laterally inward and outward, respectively, from the second upper and lower pivotable axle joints to the second upper and lower pivotable hanger joints.

According to another embodiment, a suspension system for a vehicle comprises a frame, an axle, opposing first and second frame hanger brackets, an axle assembly lift system, steering stabilizers, first upper and lower control arms, and second upper and lower control arms. The frame includes opposing longitudinal vehicle frame members. The axle includes wheels, provided with a lifted position and a lowered position. The opposing first and second frame hanger brackets are mounted to the opposing longitudinal vehicle frame members. The axle lift system adapted to lift or lower the axle. The steering stabilizers are provided with first ends that are mounted fixed relative to the vehicle frame and second ends that are mounted to steering knuckles and moveable with the axle, relative to the vehicle frame, wherein the steering stabilizers are adapted to bias the wheels in a substantially longitudinally forward direction. The first upper and lower control arms longitudinally locate a first end of the axle along the frame, include first ends pivotably mounted to the first end of the axle via a first upper pivotable axle joint and a first lower pivotable axle joint, respectively, wherein the first upper and lower pivotable axle joints are substantially aligned with each other in a lateral direction and vertically spaced from each other in a vertical direction, include second ends that are pivotably mounted to the first frame hanger bracket via first upper and lower pivotable hanger joints, respectively, wherein the first upper and lower pivotable hanger joints are spaced with respect to each other in the lateral direction and vertically spaced from each other in the vertical direction, and diverge. The second upper and lower control arms longitudinally locate a second end of the axle along the frame, include first ends pivotably mounted to the second end of the axle at second upper pivotable axle joint and a second lower pivotable axle joint, respectively, wherein the second upper and lower pivotable axle joints are substantially aligned with each other in a lateral direction and vertically spaced from each other in a vertical direction, include second ends that are pivotably mounted to the second frame hanger bracket via second upper and lower pivotable hanger joints, respectively, wherein the second upper and lower pivotable hanger joints are spaced with respect to each other in the lateral direction and vertically spaced from each other in the vertical direction.

ASPECTS

According to one aspect of the present invention, a suspension system for a vehicle comprises:
  a frame including opposing longitudinal vehicle frame members;
  an axle, including wheels, provided with a lifted position and a lowered position;
  opposing first and second frame hanger brackets mounted to the opposing longitudinal vehicle frame members;

an axle lift system adapted to lift or lower the axle,
steering stabilizers that are adapted to bias the wheels in a substantially longitudinally forward direction;
first upper and lower control arms that:
  longitudinally locate a first end of the axle along the frame;
  include first ends pivotably mounted to the first end of the axle via a first upper pivotable axle joint and a first lower pivotable axle joint, respectively, wherein the first upper and lower pivotable axle joints are substantially aligned with each other in a lateral direction and vertically spaced from each other in a vertical direction;
  include second ends that are pivotably mounted to the first frame hanger bracket via first upper and lower pivotable hanger joints, respectively, wherein the first upper and lower pivotable hanger joints are spaced with respect to each other in the lateral direction and vertically spaced from each other in the vertical direction;
  diverge, in opposite directions, laterally inward and outward, respectively, from the first upper and lower pivotable axle joints to the first upper and lower pivotable hanger joints;
second upper and lower control arms that:
  longitudinally locate a second end of the axle along the frame;
  include first ends pivotably mounted to the second end of the axle at second upper pivotable axle joint and a second lower pivotable axle joint, respectively, wherein the second upper and lower pivotable axle joints are substantially aligned with each other in a lateral direction and vertically spaced from each other in a vertical direction; and
  include second ends that are pivotably mounted to the second frame hanger bracket via second upper and lower pivotable hanger joints, respectively, wherein the second upper and lower pivotable hanger joints are spaced with respect to each other in the lateral direction and vertically spaced from each other in the vertical direction;
  diverge, in opposite directions, laterally inward and outward, respectively, from the second upper and lower pivotable axle joints to the second upper and lower pivotable hanger joints.

Preferably, all of the pivotable axle joints lie on the same lateral plane.

Preferably, all of the pivotable hanger joints lie on the same lateral plane.

Preferably, all of the pivotable axle joints lie on the same lateral plane and all of the pivotable hanger joints lie on the same lateral plane.

Preferably, the first upper and lower control arms symmetrically diverge laterally inward and outward, respectively, from the first upper and lower pivotable axle joints to the first upper and lower pivotable hanger joints, respectively and the second upper and lower control arms symmetrically diverge laterally inward and outward, respectively, from the second upper and lower pivotable axle joints to the second upper and lower pivotable hanger joints, respectively.

Preferably, all of the pivotable axle joints lie on the same lateral plane, all of the pivotable hanger joints lie on the same lateral plane, and the first upper and lower control arms symmetrically diverge laterally inward and outward, respectively, from the first upper and lower pivotable axle joints to the first upper and lower pivotable hanger joints, respectively and the second upper and lower control arms symmetrically diverge laterally inward and outward, respectively, from the second upper and lower pivotable axle joints to the second upper and lower pivotable hanger joints, respectively.

Preferably, the first upper and lower pivotable axle joints are located on a longitudinal plane that passes through a lateral midpoint between the first upper and lower pivotable hanger joints and the second upper and lower pivotable axle joints are located on another longitudinal plane that passes through another lateral midpoint between the second upper and lower pivotable hanger joints.

Preferably, all of the pivotable axle joints lie on the same lateral plane, all of the pivotable hanger joints lie on the same lateral plane, and the first upper and lower pivotable axle joints are located on a longitudinal plane that passes through a lateral midpoint between the first upper and lower pivotable hanger joints and the second upper and lower pivotable axle joints are located on another longitudinal plane that passes through another lateral midpoint between the second upper and lower pivotable hanger joints.

Preferably, all of the pivotable axle joints lie on the same lateral plane, all of the pivotable hanger joints lie on the same lateral plane, the first upper and lower control arms symmetrically diverge laterally inward and outward, respectively, from the first upper and lower pivotable axle joints to the first upper and lower pivotable hanger joints, respectively and the second upper and lower control arms symmetrically diverge laterally inward and outward, respectively, from the second upper and lower pivotable axle joints to the second upper and lower pivotable hanger joints, respectively, and the first upper and lower pivotable axle joints are located on a longitudinal plane that passes through a lateral midpoint between the first upper and lower pivotable hanger joints and the second upper and lower pivotable axle joints are located on another longitudinal plane that passes through another lateral midpoint between the second upper and lower pivotable hanger joints.

Preferably, a tie rod interconnects steering knuckles located at each end of the axle.

Preferably, a tie rod interconnects steering knuckles located at each end of the axle, all of the pivotable axle joints lie on the same lateral plane, all of the pivotable hanger joints lie on the same lateral plane, the first upper and lower control arms symmetrically diverge laterally inward and outward, respectively, from the first upper and lower pivotable axle joints to the first upper and lower pivotable hanger joints, respectively and the second upper and lower control arms symmetrically diverge laterally inward and outward, respectively, from the second upper and lower pivotable axle joints to the second upper and lower pivotable hanger joints, respectively, and the first upper and lower pivotable axle joints are located on a longitudinal plane that passes through a lateral midpoint between the first upper and lower pivotable hanger joints and the second upper and lower pivotable axle joints are located on another longitudinal plane that passes through another lateral midpoint between the second upper and lower pivotable hanger joints.

Preferably, the first frame hanger bracket is laterally interposed between the first upper and lower hanger joints so that the first upper pivotable hanger joint is on one side of the first frame hanger and the first lower pivotable hanger joint is on an opposite side of the first frame hanger and the second frame hanger bracket is laterally interposed between the second upper and lower hanger joints so that the second upper pivotable hanger joint is on one side of the second frame hanger and the second lower pivotable hanger joint is on an opposite side of the second frame hanger.

Preferably, the steering stabilizers are provided with first ends that are mounted fixed relative to the vehicle frame and second ends that are mounted to steering knuckles and moveable with the axle, relative to the vehicle frame.

According to another aspect of the present invention, a suspension system for a vehicle comprises:
- a frame including opposing longitudinal vehicle frame members;
- an axle, including wheels, provided with a lifted position and a lowered position;
- opposing first and second frame hanger brackets mounted to the opposing longitudinal vehicle frame members;
- an axle lift system adapted to lift or lower the axle;
- steering stabilizers provided with first ends that are mounted fixed relative to the vehicle frame and second ends that are mounted to steering knuckles and moveable with the axle, relative to the vehicle frame, wherein the steering stabilizers are adapted to bias the wheels in a substantially longitudinally forward direction;
- first upper and lower control arms that:
  - longitudinally locate a first end of the axle along the frame;
  - include first ends pivotably mounted to the first end of the axle via a first upper pivotable axle joint and a first lower pivotable axle joint, respectively, wherein the first upper and lower pivotable axle joints are substantially aligned with each other in a lateral direction and vertically spaced from each other in a vertical direction;
  - include second ends that are pivotably mounted to the first frame hanger bracket via first upper and lower pivotable hanger joints, respectively, wherein the first upper and lower pivotable hanger joints are spaced with respect to each other in the lateral direction and vertically spaced from each other in the vertical direction;
- second upper and lower control arms that:
  - longitudinally locate a second end of the axle along the frame;
  - include first ends pivotably mounted to the second end of the axle at second upper pivotable axle joint and a second lower pivotable axle joint, respectively, wherein the second upper and lower pivotable axle joints are substantially aligned with each other in a lateral direction and vertically spaced from each other in a vertical direction; and
  - include second ends that are pivotably mounted to the second frame hanger bracket via second upper and lower pivotable hanger joints, respectively, wherein the second upper and lower pivotable hanger joints are spaced with respect to each other in the lateral direction and vertically spaced from each other in the vertical direction.

DETAILED DESCRIPTION OF THE INVENTION

Figure 1:
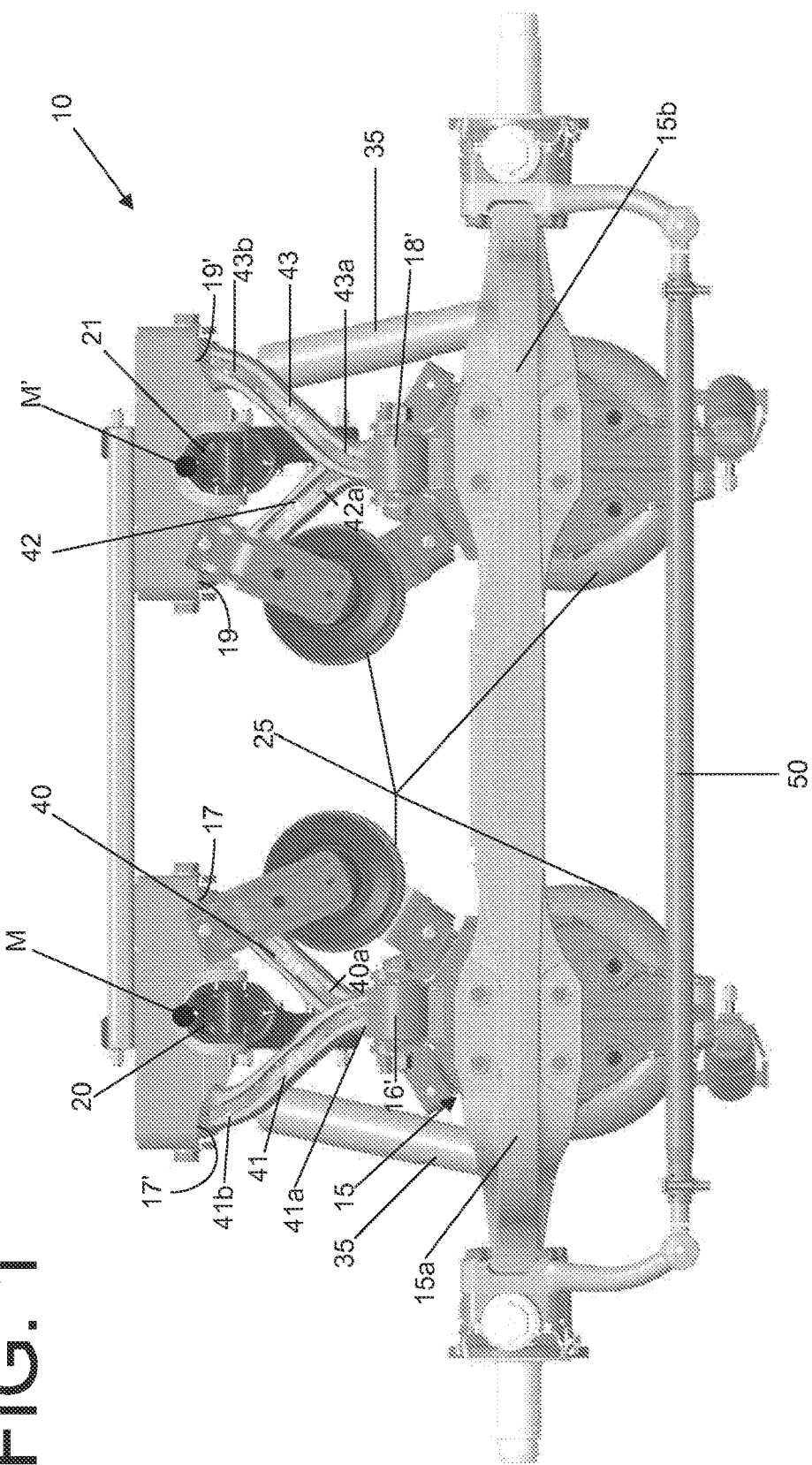
FIG. 1 illustrates a suspension system for a self-steering pusher or tag axle according to one embodiment.
Figure 2:
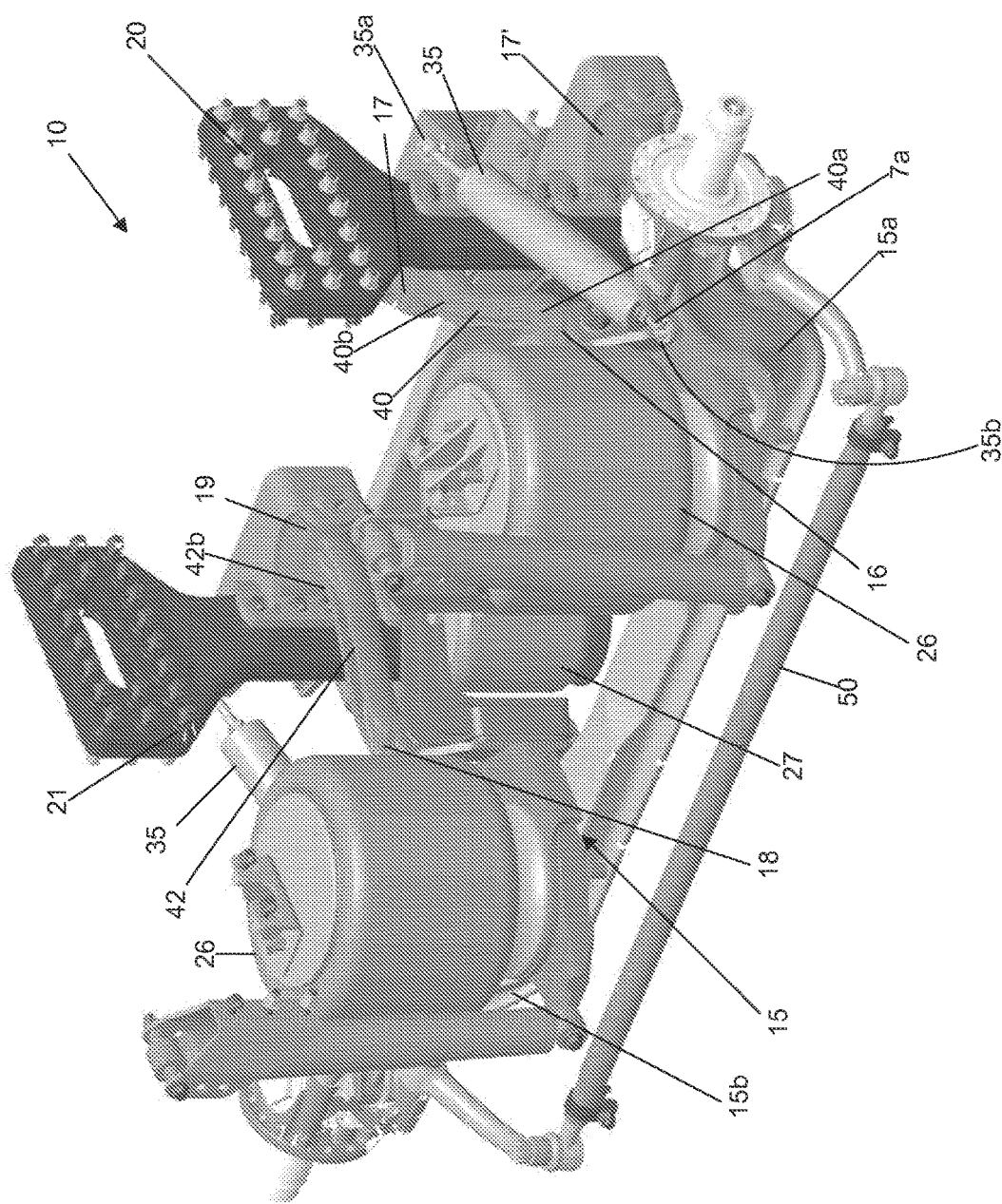
FIG. 2 illustrates a suspension system for a self-steering pusher or tag axle according to one embodiment.
Figure 3:
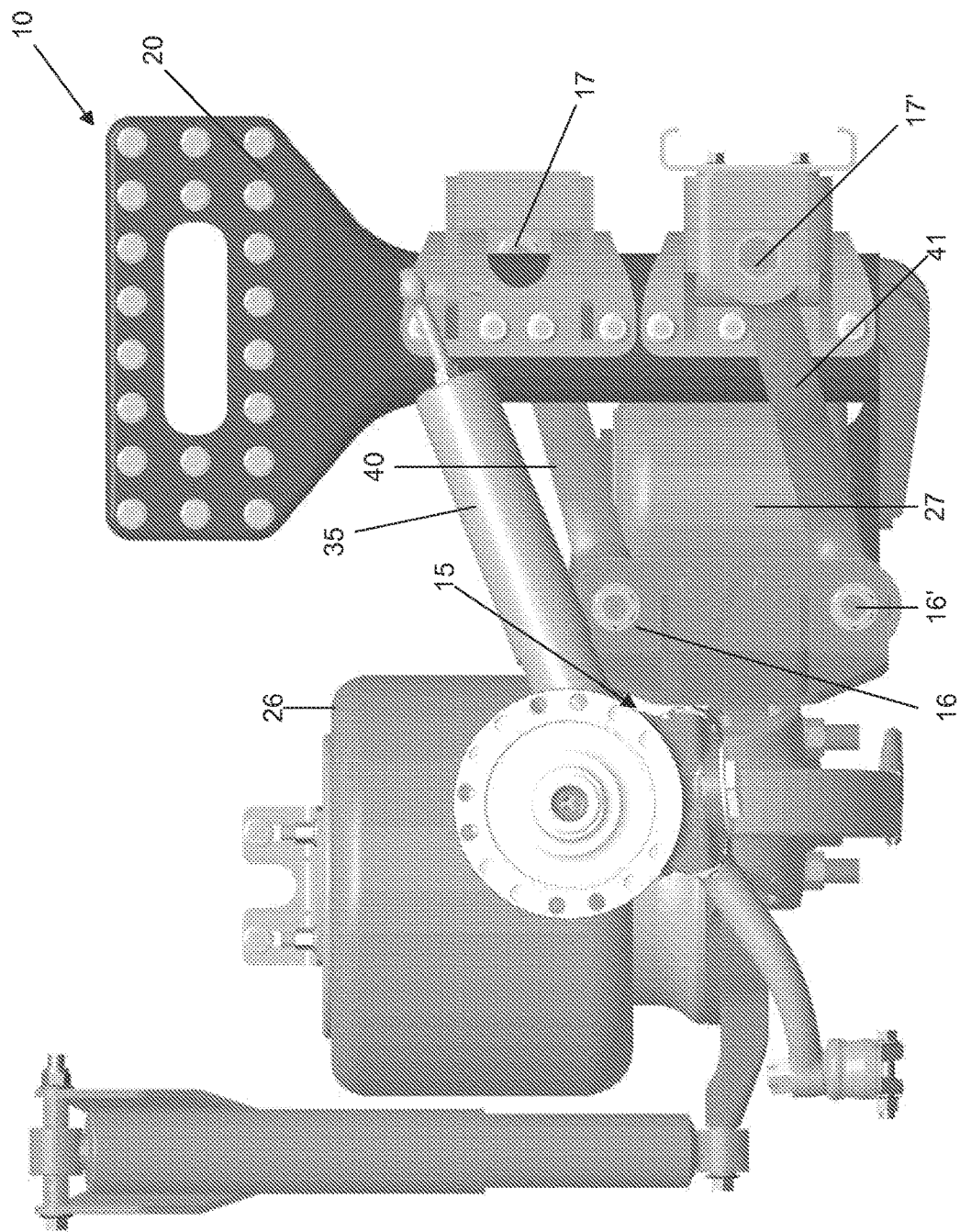
FIG. 3 illustrates a suspension system for a self-steering pusher or tag axle according to one embodiment.
Figure 4:
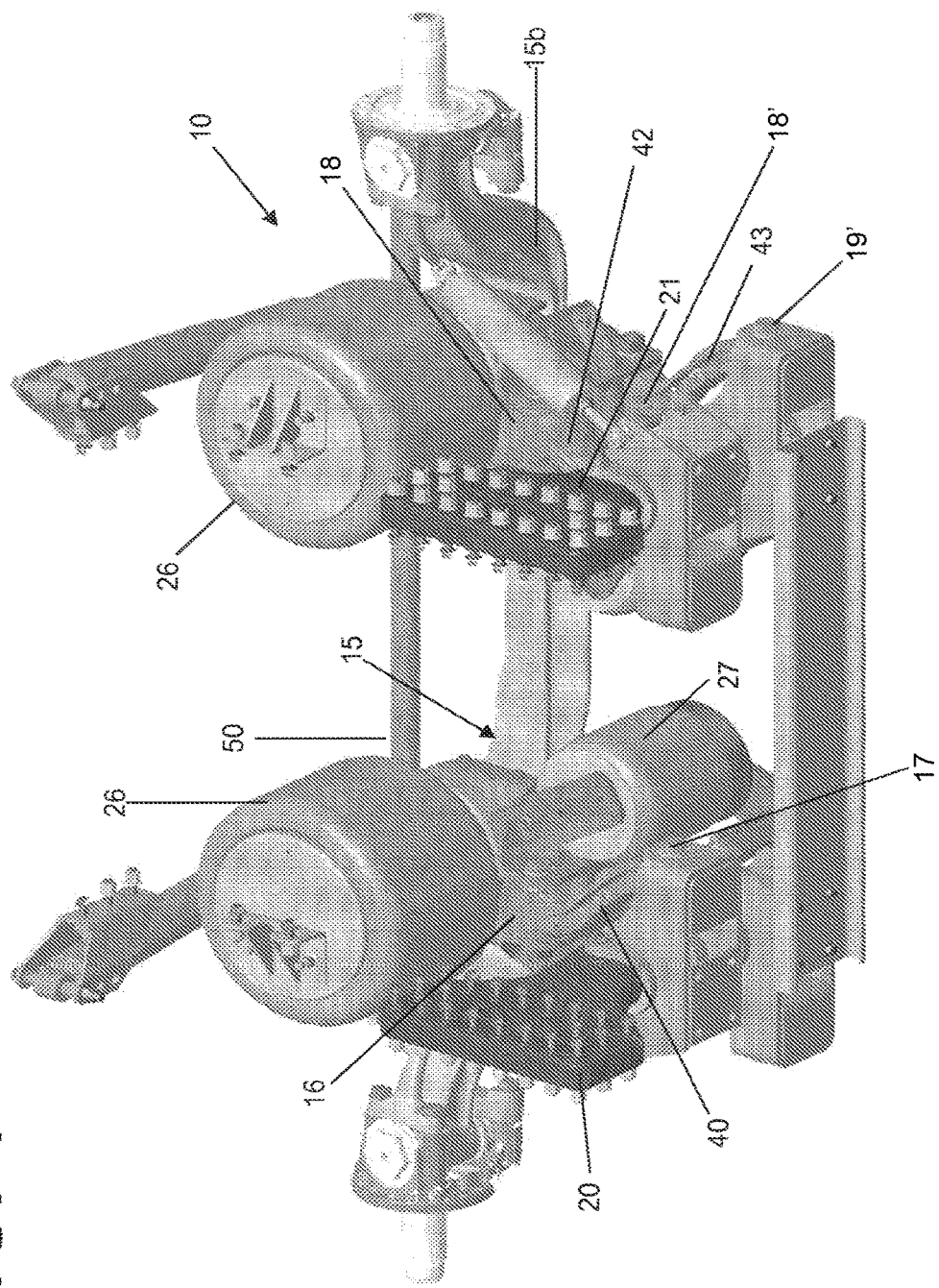
FIG. 4 illustrates a suspension system for a self-steering pusher or tag axle according to one embodiment.

FIGS. 1-4 illustrate a suspension system 10 for a vehicle according to one embodiment. As shown, the suspension system 10 of the present embodiment includes an axle 15, opposing first and second frame hanger brackets 20, 21, an axle lift system 25, steering stabilizers 35, first upper and lower control arms 40, 41, and second upper and lower control arms 42, 43.

Figure 5A:
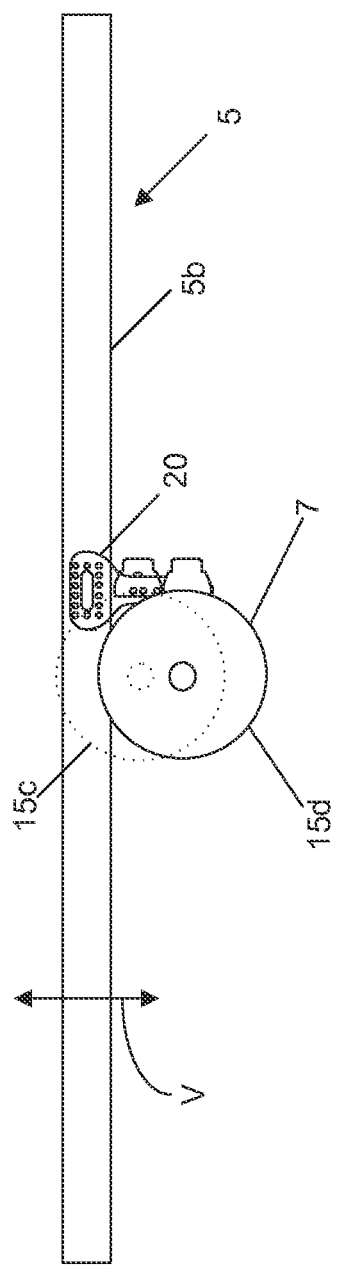
FIG. 5A illustrates a vehicle frame according to one embodiment.

Those of ordinary skill in the art will appreciate that the first and second frame hanger brackets 20, 21 are mounted to opposing longitudinal vehicle frame members 5a, 5b, as shown in FIGS. 5A and B, of a vehicle frame 5. Furthermore, those of ordinary skill in the art will appreciate that the axle 15, has a lifted position 15c and a lowered position 15d. Moreover, those of ordinary skill in the art will appreciate that the axle lift system 25 lifts or lowers the axle 15 in response to an increase in air pressure in lowering bladders 26 or lifting bladders 27, respectively.

Figure 5B:
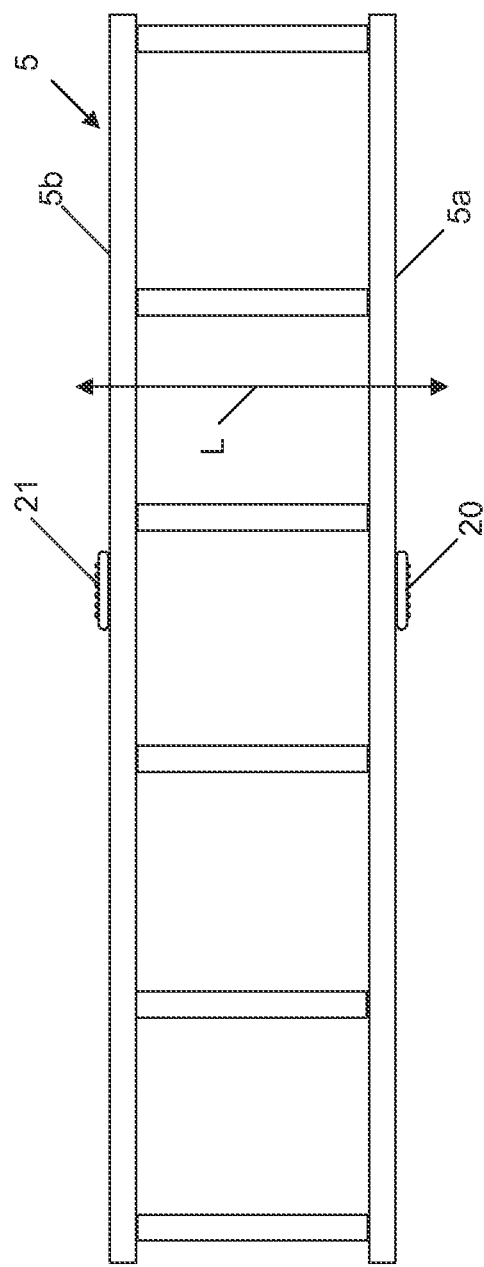
FIG. 5B illustrates a vehicle frame according to one embodiment.

Those of ordinary skill in the art will appreciate that steering stabilizers 35 bias the wheels 7 (FIG. 5B) in a substantially longitudinally forward direction, but allow the wheels to self-steer and turn while cornering when the biasing force of the steering stabilizers 35 are exceeded by the tire turning forces. In the present embodiment, the steering stabilizers 35 are advantageously adapted to provide improved forward bump steering biasing. As shown, the steering stabilizers 35 are preferably provided with first ends 35a that are mounted fixed relative to the vehicle frame 5 and second ends 35b that are mounted to the steering knuckles 7a and are moveable with the axle 15, relative to the vehicle frame 5. As shown, by way of example, the steering stabilizers 35 may have first ends 35a that are mounted to frame hanger brackets 20, 21. Also shown, the steering stabilizers 35 may extend substantially perpendicular to the axle 15.

According to one aspect of the present embodiment, the control arms 40-43 mount the axle 15 to the frame hanger brackets 20, 21. According to another aspect of the present embodiment, the first upper and lower control arms 40, 41 longitudinally locate a first end 15a of the axle 15 along the frame 5 and the second upper and lower control arms 42, 43 longitudinally locate a second end 15b of the axle 15 along the frame 5.

The first upper and lower control arms 40, 41 include first ends 40a, 41a that are pivotably mounted to the first end 15a of the axle 15 via a first upper pivotable axle joint 16 and a first lower pivotable axle joint 16', respectively. Also shown, the second upper and lower control arms 42, 43 include first ends 42a, 43a pivotably mounted to the second end 15b of the axle 15 via a second upper pivotable axle joint 18 and a second lower pivotable axle joint 18', respectively. Furthermore, the first upper and lower pivotable axle joints 16 and 16' are substantially aligned with each other in lateral direction L and vertically spaced from each other in vertical direction V. Likewise, the second upper and lower pivotable axle joints 18 and 18' are substantially aligned with each other in the lateral direction L and vertically spaced from each other in the vertical direction V. As shown, the pivotable axle joints 16, 16', 18, 18' preferably lie on the same lateral plane; however in an alternative embodiment, the pivotable axle joints 16, 16', 18, 18' may lie on more than one plane.

As shown, the first upper and lower control arms 40, 41 include second ends 40b, 41b that are pivotably mounted to the first frame hanger bracket 20 at first upper and lower pivotable hanger joints 17 and 17', respectively. The second upper and lower control arms 42, 43 also include second ends 42b, 43b pivotably mounted to the second frame hanger bracket 21 at second upper and lower pivotable hanger joints 19 and 19', respectively. Furthermore, the first upper and lower pivotable hanger joints 17 and 17' are spaced with respect to each other in the lateral direction L and vertically spaced from each other in the vertical direction V. Likewise, the second upper and lower pivotable hanger joints 19 and 19' are spaced with respect to each other in the lateral direction L and vertically spaced from each other in the vertical direction V. As shown, the pivotable hanger joints 17, 17', 19, 19' preferably lie on the same lateral plane; however in an alternative embodiment, the pivotable hanger joints 17, 17', 19, 19' may lie on more than one plane.

Also shown, the first frame hanger bracket 20 is preferably laterally interposed between the first upper and lower hanger joints 17, 17' so that the first upper pivotable hanger joint 17 is on one side of the first frame hanger 20 and the first lower pivotable hanger joint 17' is on an opposite side of the second frame hanger 21. Likewise, the second frame hanger bracket 21 is laterally interposed between the second upper and lower hanger joints 17, 17' so that the second upper pivotable hanger joint 19 is on one side of the second frame hanger 21 and the second lower pivotable hanger joint 19' is on an opposite side of the second frame hanger 21. In alternative embodiments, the joints 17, 17' may be located on the same side of the hangers 20, 21.

As shown best in FIG. 1, the first lower pivotable axle joint 16' and second lower pivotable axle joint 18' are longitudinally spaced from and located laterally inward with respect to the first and second lower pivotable hanger joints 17', 19', respectively. Also shown best in FIG. 1, the first upper pivotable axle joint 16 and second upper pivotable axle joint 18 are longitudinally spaced from and located laterally outward with respect to the first and second upper pivotable hanger joints 17, 19, respectively.

As shown best in FIG. 1, the first upper and lower control arms 40, 41 preferably diverge, in opposite directions, laterally inward and outward, respectively, from the first upper and lower pivotable axle joints 16, 18 to the first upper and lower pivotable hanger joints 17, 19, respectively. Also shown best in FIG. 1, the second upper and lower control arms 42, 43 preferably diverge laterally inward and outward, respectively, from the second upper and lower pivotable axle joints 16', 18' to the second upper and lower pivotable hanger joints 17', 19', respectively. Although shown symmetrically diverging, in alternative embodiments, the first and second upper and lower control arms 40, 41 and 42, 43 may diverge in non-symmetrical fashion.

The first upper and lower pivotable axle joints 16, 18 are preferably located on a longitudinal plane that passes through the lateral midpoint M between the first upper and lower pivotable hanger joints 17, 19, as shown in FIG. 1. Additionally, the second upper and lower pivotable axle joints 16', 18' are preferably located on a longitudinal plane that passes through the lateral midpoint M' between the second upper and lower pivotable hanger joints 17', 19', as shown in FIG. 1. In alternative embodiments, the pivotable axle joints 16, 16', 18, 18' may be somewhat laterally off-set.

Advantageously, the suspension system 10 allows larger articulations while maintaining the desired load on each wheel end. The suspension system 10 may be left in the lowered position 15d while on the job site, without requiring a larger or heavier than needed rear suspension or requiring an operator to slow down to "creep rating".

Persons skilled in the art will recognize that certain elements of the above-described embodiments and examples may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Thus, although specific embodiments of, and examples for, the invention are described herein for illustrative purposes, various equivalent modifications are possible within the scope of the invention, as those skilled in the relevant art will recognize. Accordingly, the scope of the invention is determined from the appended claims and equivalents thereof.

The present description depicts specific examples to teach those skilled in the art how to make and use the best mode of the invention. The detailed descriptions of the above embodiments are not exhaustive descriptions of all embodiments contemplated by the inventors to be within the scope of the invention. By way of example, and not limitation, a tie rod 50 may interconnect steering knuckles at each end 15a, 15 of the axle 15 to improve steering characteristics in some embodiments. By way of another example, and not limitation, in alternative embodiments alternative lift systems may be employed, including, but not limited to non-pneumatic designs.

Persons skilled in the art will recognize that certain elements of the above-described embodiments may variously be combined or eliminated to create further embodiments, and such further embodiments fall within the scope and teachings of the invention. Thus, although specific embodiments of, and examples for, the invention are described herein for illustrative purposes, various equivalent modifications are possible within the scope of the invention, as those skilled in the relevant art will recognize. Accordingly, the scope of the invention is determined from the appended claims and equivalents thereof.

We claim:

1. A suspension system for a vehicle, comprising:
    a frame including opposing longitudinal vehicle frame members; an axle, including wheels, provided with a lifted position and a lowered position;
    opposing first and second frame hanger brackets mounted to the opposing longitudinal vehicle frame members;
    an axle lift system adapted to lift or lower the axle;
    steering stabilizers that are adapted to bias the wheels in a substantially longitudinally forward direction;
    first upper and lower control arms that:
        longitudinally locate a first end of the axle along the frame;
        include first ends pivotably mounted to the first end of the axle via a first upper pivotable axle joint and a first lower pivotable axle joint, respectively, wherein the first upper and lower pivotable axle joints are substantially aligned with each other in a lateral direction and vertically spaced from each other in a vertical direction;
        include second ends that are pivotably mounted to the first frame hanger bracket via first upper and lower pivotable hanger joints, respectively, wherein the first upper and lower pivotable hanger joints are spaced with respect to each other in the lateral direction and vertically spaced from each other in the vertical direction; and diverge, in opposite directions, laterally inward and outward, respectively, from the first upper and lower pivotable axle joints to the first upper and lower pivotable hanger joints; and second upper and lower control arms that:

longitudinally locate a second end of the axle along the frame;

include first ends pivotably mounted to the second end of the axle at second upper pivotable axle joint and a second lower pivotable axle joint, respectively, wherein the second upper and lower pivotable axle joints are substantially aligned with each other in a lateral direction and vertically spaced from each other in a vertical direction;

include second ends that are pivotably mounted to the second frame hanger bracket via second upper and lower pivotable hanger joints, respectively, wherein the second upper and lower pivotable hanger joints are spaced with respect to each other in the lateral direction and vertically spaced from each other in the vertical direction; and diverge, in opposite directions, laterally inward and outward, respectively, from the second upper and lower pivotable axle joints to the second upper and lower pivotable hanger joints.

2. The suspension system for a vehicle according to claim 1, wherein all of the pivotable axle joints lie on the same lateral plane.

3. The suspension system for a vehicle according to claim 1, wherein all of the pivotable hanger joints lie on the same lateral plane.

4. The suspension system for a vehicle according to claim 1, wherein:

all of the pivotable axle joints lie on the same lateral plane; and all of the pivotable hanger joints lie on the same lateral plane.

5. The suspension system for a vehicle according to claim 1, wherein the first upper and lower control arms symmetrically diverge laterally inward and outward, respectively, from the first upper and lower pivotable axle joints to the first upper and lower pivotable hanger joints, respectively and the second upper and lower control arms symmetrically diverge laterally inward and outward, respectively, from the second upper and lower pivotable axle joints to the second upper and lower pivotable hanger joints, respectively.

6. The suspension system for a vehicle according to claim 1, wherein:

all of the pivotable axle joints lie on the same lateral plane;

all of the pivotable hanger joints lie on the same lateral plane; and the first upper and lower control arms symmetrically diverge laterally inward and outward, respectively, from the first upper and lower pivotable axle joints to the first upper and lower pivotable hanger joints, respectively and the second upper and lower control arms symmetrically diverge laterally inward and outward, respectively, from the second upper and lower pivotable axle joints to the second upper and lower pivotable hanger joints, respectively.

7. The suspension system for a vehicle according to claim 1, wherein the first upper and lower pivotable axle joints are located on a longitudinal plane that passes through a lateral midpoint between the first upper and lower pivotable hanger joints and the second upper and lower pivotable axle joints are located on another longitudinal plane that passes through another lateral midpoint between the second upper and lower pivotable hanger joints.

8. The suspension system for a vehicle according to claim 1, wherein:

all of the pivotable axle joints lie on the same lateral plane;

all of the pivotable hanger joints lie on the same lateral plane;

and the first upper and lower pivotable axle joints are located on a longitudinal plane that passes through a lateral midpoint between the first upper and lower pivotable hanger joints and the second upper and lower pivotable axle joints are located on another longitudinal plane that passes through another lateral midpoint between the second upper and lower pivotable hanger joints.

9. The suspension system for a vehicle according to claim 1, wherein:

all of the pivotable axle joints lie on the same lateral plane;

all of the pivotable hanger joints lie on the same lateral plane;

the first upper and lower control arms symmetrically diverge laterally inward and outward, respectively, from the first upper and lower pivotable axle joints to the first upper and lower pivotable hanger joints, respectively and the second upper and lower control arms symmetrically diverge laterally inward and outward, respectively, from the second upper and lower pivotable axle joints to the second upper and lower pivotable hanger joints, respectively; and the first upper and lower pivotable axle joints are located on a longitudinal plane that passes through a lateral midpoint between the first upper and lower pivotable hanger joints and the second upper and lower pivotable axle joints are located on another longitudinal plane that passes through another lateral midpoint between the second upper and lower pivotable hanger joints.

10. The suspension system for a vehicle according to claim 1, further comprising a tie rod that interconnects steering knuckles located at each end of the axle.

11. The suspension system for a vehicle according to claim 1, further comprising a tie rod that interconnects steering knuckles located at each end of the axle and wherein:

all of the pivotable axle joints lie on the same lateral plane;

all of the pivotable hanger joints lie on the same lateral plane;

the first upper and lower control arms symmetrically diverge laterally inward and outward, respectively, from the first upper and lower pivotable axle joints to the first upper and lower pivotable hanger joints, respectively and the second upper and lower control arms symmetrically diverge laterally inward and outward, respectively, from the second upper and lower pivotable axle joints to the second upper and lower pivotable hanger joints, respectively; and the first upper and lower pivotable axle joints are located on a longitudinal plane that passes through a lateral midpoint between the first upper and lower pivotable hanger joints and the second upper and lower pivotable axle joints are located on another longitudinal plane that passes through another lateral midpoint between the second upper and lower pivotable hanger joints.

12. The suspension system for a vehicle according to claim 1, wherein:
the first frame hanger bracket is laterally interposed between the first upper and lower hanger joints so that the first upper pivotable hanger joint is on one side of the first frame hanger and the first lower pivotable hanger joint is on an opposite side of the first frame hanger; and
the second frame hanger bracket is laterally interposed between the second upper and lower hanger joints so that the second upper pivotable hanger joint is on one side of the second frame hanger and the second lower pivotable hanger joint is on an opposite side of the second frame hanger.

13. The suspension system for a vehicle according to claim 1, wherein the steering stabilizers are provided with first ends that are mounted fixed relative to the vehicle frame and second ends that are mounted to steering knuckles and moveable with the axle, relative to the vehicle frame.

14. The suspension system for a vehicle according to claim 13, wherein the steering stabilizers extend substantially perpendicular to the axle.

15. A suspension system for a vehicle, comprising:
a frame including opposing longitudinal vehicle frame members;
an axle, including wheels, provided with a lifted position and a lowered position;
opposing first and second frame hanger brackets mounted to the opposing longitudinal vehicle frame members;
an axle lift system adapted to lift or lower the axle;
steering stabilizers provided with first ends that are mounted fixed relative to the vehicle frame and second ends that are mounted to steering knuckles and moveable with the axle, relative to the vehicle frame, wherein the steering stabilizers are adapted to bias the wheels in a substantially longitudinally forward direction, and wherein the steering stabilizers extend substantially perpendicular to the axle;
first upper and lower control arms that:
longitudinally locate a first end of the axle along the frame;
include first ends pivotably mounted to the first end of the axle via a first upper pivotable axle joint and a first lower pivotable axle joint, respectively, wherein the first upper and lower pivotable axle joints are substantially aligned with each other in a lateral direction and vertically spaced from each other in a vertical direction; and
include second ends that are pivotably mounted to the first frame hanger bracket via first upper and lower pivotable hanger joints, respectively, wherein the first upper and lower pivotable hanger joints are spaced with respect to each other in the lateral direction and vertically spaced from each other in the vertical direction; and
second upper and lower control arms that:
longitudinally locate a second end of the axle along the frame;
include first ends pivotably mounted to the second end of the axle at second upper pivotable axle joint and a second lower pivotable axle joint, respectively, wherein the second upper and lower pivotable axle joints are substantially aligned with each other in a lateral direction and vertically spaced from each other in a vertical direction; and
include second ends that are pivotably mounted to the second frame hanger bracket via second upper and lower pivotable hanger joints, respectively, wherein the second upper and lower pivotable hanger joints are spaced with respect to each other in the lateral direction and vertically spaced from each other in the vertical direction.

16. The suspension system for a vehicle according to claim 15, wherein all of the pivotable axle joints lie on the same lateral plane.

17. The suspension system for a vehicle according to claim 15, wherein all of the pivotable hanger joints lie on the same lateral plane.

18. The suspension system for a vehicle according to claim 15, wherein the first upper and lower control arms symmetrically diverge laterally inward and outward, respectively, from the first upper and lower pivotable axle joints to the first upper and lower pivotable hanger joints, respectively and the second upper and lower control arms symmetrically diverge laterally inward and outward, respectively, from the second upper and lower pivotable axle joints to the second upper and lower pivotable hanger joints, respectively.

19. The suspension system for a vehicle according to claim 15, wherein the first upper and lower pivotable axle joints are located on a longitudinal plane that passes through a lateral midpoint between the first upper and lower pivotable hanger joints and the second upper and lower pivotable axle joints are located on another longitudinal plane that passes through another lateral midpoint between the second upper and lower pivotable hanger joints.

20. The suspension system for a vehicle according to claim 15, further comprising a tie rod that interconnects the steering knuckles, wherein the steering knuckles are located at each end of the axle.

* * * * *